United States Patent
Yu et al.

(10) Patent No.: US 8,112,297 B2
(45) Date of Patent: Feb. 7, 2012

(54) DUAL-WAREHOUSE MANAGEMENT SYSTEM AND METHOD FOR CALCULATING THE MINIMUM JOINT COST OF A SUPPLY CHAIN

(75) Inventors: Chao-Pen Yu, Taoyuan County (TW); Kung-Jeng Wang, Taipei County (TW); Hui-Ming Wee, Taoyuan County (TW); Yu-Siang Lin, Taipei County (TW)

(73) Assignee: National Taiwan University of Science and Technology, Taipei (TW)

( * ) Notice: Subject to any disclaimer, the term of this patent is extended or adjusted under 35 U.S.C. 154(b) by 231 days.

(21) Appl. No.: 12/545,047

(22) Filed: Aug. 20, 2009

(65) Prior Publication Data

US 2010/0179848 A1 Jul. 15, 2010

(30) Foreign Application Priority Data

Jan. 14, 2009 (TW) ................. 98101219 A

(51) Int. Cl.
*G06Q 10/00* (2006.01)
(52) U.S. Cl. ..................... 705/7.11
(58) Field of Classification Search .................. 705/7.11
See application file for complete search history.

(56) References Cited

U.S. PATENT DOCUMENTS

| | | | |
|---|---|---|---|
| 7,250,858 B2* | 7/2007 | Schmidtberg et al. ... | 340/539.13 |
| 7,376,601 B1* | 5/2008 | Aldridge ............... | 705/28 |
| 7,401,036 B2* | 7/2008 | Vande Pol .............. | 705/35 |
| 7,496,525 B1* | 2/2009 | Mitchell ................ | 705/26.8 |
| 8,036,957 B2* | 10/2011 | Ettl et al. .............. | 705/28 |
| 2002/0032610 A1* | 3/2002 | Gold et al. ............. | 705/20 |
| 2003/0014342 A1* | 1/2003 | Vande Pol .............. | 705/36 |
| 2003/0074284 A1* | 4/2003 | Bowden ................. | 705/28 |
| 2003/0130883 A1* | 7/2003 | Schroeder et al. ...... | 705/10 |
| 2006/0009990 A1* | 1/2006 | McCormick ............ | 705/1 |
| 2009/0299779 A1* | 12/2009 | Ettl et al. .............. | 705/7 |

FOREIGN PATENT DOCUMENTS

| | | |
|---|---|---|
| TW | 559721 | 11/2003 |
| TW | I236603 | 7/2005 |
| TW | I295445 | 4/2008 |

OTHER PUBLICATIONS

Wee, Hui-Ming. Optimal buyer-seller discount pricing and ordering policy for deteriorating items. Engineering Economist v43n2 Winter 1998.*
Yang, P C; Wee, H M. An excess inventory model of deteriorating items taking account of present value. Engineering Economist v46n2 2001.*

* cited by examiner

Primary Examiner — Johnna Loftis
(74) Attorney, Agent, or Firm — Jianq Chyun IP Office

(57) ABSTRACT

A dual-warehouse management system for a supply chain and a method for calculating a minimum of a joint cost thereof are provided. A manufacturer function module and a distributor function module are used to estimate a manufacturer's total cost and a distributor's total cost respectively. Afterwards, a joint cost optimization module is used to calculate a minimum joint cost. Accordingly, a product lot and a delivery time of a deteriorating item delivered from the manufacturer to the distributor are obtained in a planning horizon.

13 Claims, 4 Drawing Sheets

DUAL-WAREHOUSE MANAGEMENT SYSTEM AND METHOD FOR CALCULATING THE MINIMUM JOINT COST OF A SUPPLY CHAIN

CROSS-REFERENCE TO RELATED APPLICATION

This application claims the priority benefit of Taiwan application serial no. 98101219, filed on Jan. 14, 2009. The entirety of the above-mentioned patent application is hereby incorporated by reference herein and made a part of specification.

BACKGROUND OF THE INVENTION

1. Field of the Invention

The present invention relates to a management system of a supply chain. More particularly, the present invention relates to a dual-warehouse management system for a supply chain and a method for calculating a minimum joint cost thereof.

2. Description of Related Art

With quick development of global economy, market competitions are increasingly intense. A two-stage supply chain is consisted of a manufacturer and a distributor. In order to reduce their respective costs, the manufacture and the distributor need to collaborate.

Accordingly, to satisfy market demand, effectively control an inventory has become very important. Moreover, how to effectively utilize a storage space and improve an inventory tactic is also an important issue.

SUMMARY OF THE INVENTION

The present invention is directed to a dual-warehouse management system for a supply chain, whereby a manufacture and a distributor benefit through collaborations.

The present invention is directed to a method to derive a minimum joint cost, by which an optimal product lot and delivery times of the deteriorating item delivered from the manufacturer to the distributor are calculated.

The present invention provides a dual-warehouse management system for a supply chain. The supply chain includes a manufacturer and a distributor. The manufacturer delivers a product lot of deteriorating items to the distributor, and the distributor manages a primary distribution warehouse and a secondary distribution warehouse for storing the product lot in the primary distribution warehouse, and storing remained product lot in the secondary distribution warehouse when the primary distribution warehouse reaches a maximum capacity. The dual-warehouse management system for a supply chain includes a manufacturer function module, a distributor function module and a joint cost optimization module.

Accordingly, the manufacturer function module is used for estimating the total cost of the manufacturer according to its inventory level, manufacturing deteriorating cost and delivery times of the deteriorating item for the manufacturer. The distributor function module is used for estimating the total cost of the distributor according to its inventory level, deteriorating cost and the delivery times of the deteriorating item for the primary distribution warehouse and the secondary distribution warehouse. The joint cost optimization module is used for calculating a minimum joint cost obtained by adding the manufacturer's total cost and the distributor's total cost, so as to obtain the optimal product lot and the delivery times of the deteriorating item to be delivered from the manufacturer to the distributor in a planning horizon. Wherein, when the joint cost with the delivery times of n is less than or equal to the joint cost with the delivery times of n+1, and meanwhile when the joint cost with the delivery times of n is also less than or equal to the joint cost with the delivery times of n−1, the joint cost with the delivery times of n is determined to be the minimum.

The present invention provides a method for calculating a minimum joint cost for a dual-warehouse management system of a supply chain. First, the manufacturer's information and the distributor's information are provided. The manufacturer's information includes a manufacturing inventory level and a manufacturing deteriorating cost of a deteriorating item, and the distributor's information includes a respective distributing inventory level and a respective distributing deteriorating cost of the deteriorating item in the primary distribution warehouse and the secondary distribution warehouse. Next, a manufacturer's total cost and a distributor's total cost are respectively estimated according to the manufacturer's information and the distributor's information. Next, a minimum joint cost obtained by adding the manufacturer's total cost and the distributor's total cost is estimated for calculating an approximate solution of a product lot, so as to obtain the product lot and a delivery times of the deteriorating item to be delivered from the manufacturer to the distributor in a planning horizon. Next, based on such product lot, the joint costs with the delivery times of n, n+1 and n−1 are compared, wherein n is a positive number and an initial value thereof is 1. Finally, when the joint cost with the delivery times of n is greater than the joint cost with the delivery times of n+1, or when the joint cost with the delivery times of n is greater than the joint cost with the delivery times of n−1, after n is added by 1, another approximate product lot is repeatedly calculated until the joint cost with the delivery times of n is less than or equal to the joint cost with the delivery times of n+1, and meanwhile the joint cost with the delivery times of n is also less than or equal to the joint cost with the delivery times of n−1.

Based on the above description, in the present invention, an optimal product lot and an optimal delivering frequency can be calculated, so as to effectively reduce inventory costs of the manufacturer and the distributor, and establish a mutual beneficial manufacturing and distributing collaborative mode. Moreover, the distributor can design a scale of the primary distribution warehouse according to the optimal product lot.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

For simplicity, in the following embodiment, a primary distribution warehouse of a distributor is, for example, an owned warehouse of the distributor, and a secondary distribution warehouse is, for example, a rented warehouse of the distributor.

Figure 1:
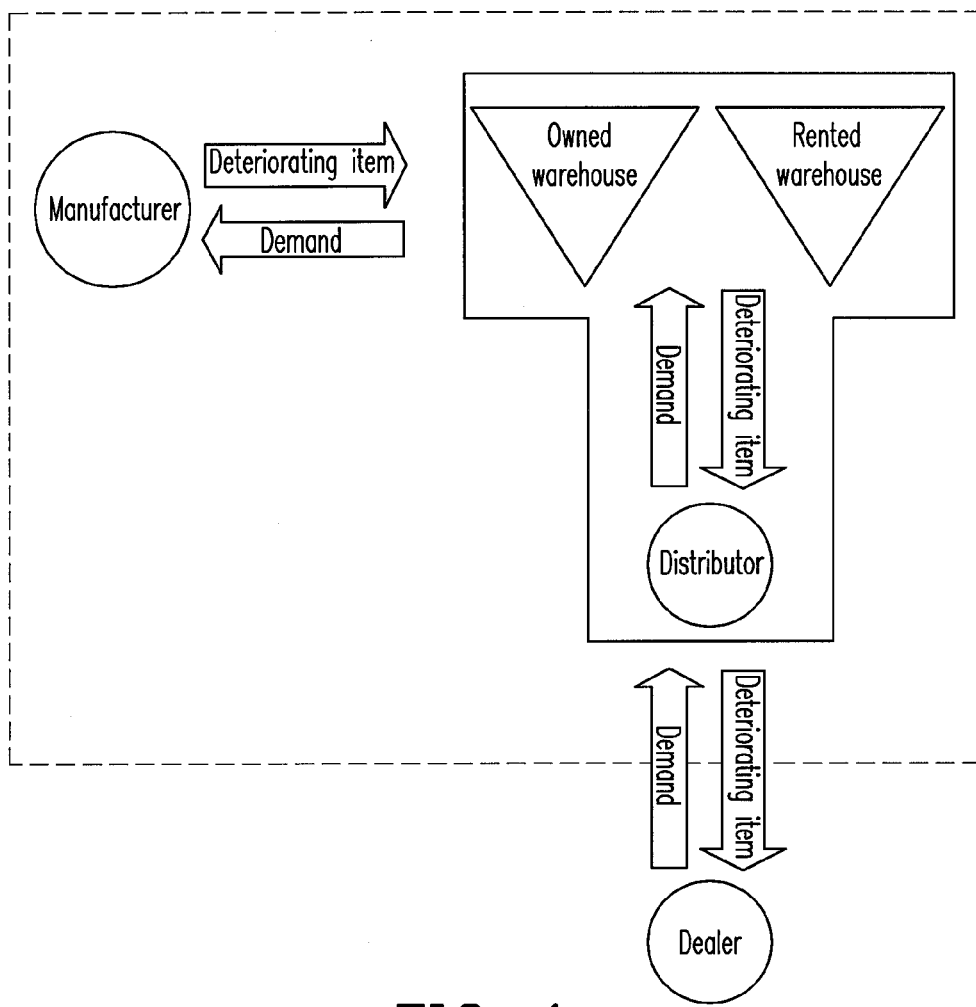
FIG. 1 is a schematic diagram illustrating a two-stage supply chain (consisting of a manufacturer and a distributor) integrated with an inventory management system according to an embodiment of the present invention.

FIG. 1 is a schematic diagram illustrating a two-stage supply chain (consisting of a manufacturer and a distributor) integrated with an inventory management system according to an embodiment of the present invention. Referring to FIG. 1, the manufacturer manufactures products according to a demand of the distributor during a manufacturing period, and immediately delivers the products to the distributor's owned warehouse. When the owned warehouse is saturated, the remained products are delivered to the rented warehouse for storage. The distributor first ships out the products from the rented warehouse according to a demand of a retailer, and after products in the rented warehouse are all shipped out, the products in the owned warehouse are then shipped.

Based on the two-stage supply chain, an embodiment is provided below for describing dual-warehouse management system for a supply chain.

FIGS. 2A-2D are block diagrams illustrating a dual-warehouse management system for a supply chain according to an embodiment of the present invention. First, referring to FIG. 2A, the dual-warehouse management system 200 for the supply chain includes a manufacturer function module 210, a distributor function module 220 and a joint cost optimization module 230. Here, the manufacturer function module 210, the distributor function module 220 and the joint cost optimization module 230 are, for example, programs written based on a computer programming language, which can be executed through computers.

In the present embodiment, the manufacturer's information and the distributor's information are stored in a database of a storage device of the computer system, which can be read by the dual-warehouse management system 200 for executing corresponding calculations. Here, the dual-warehouse management system 200 for the supply chain simultaneously considers inventory modes of the manufacturer and the distributor, so that both of the manufacturer and the distributor can save their costs and increase their profits.

The manufacturer function module 210 is used for estimating a manufacturer's total cost according to a manufacturing inventory level, a manufacturing deteriorating cost and a delivery times of a deteriorating item for the manufacturer. The so-called deteriorating refers to any process that the product cannot normally execute an original function thereof, and such phenomenon may lead to a reduction of the inventory besides a demand consumption, and the inventory having such phenomenon is referred to as the deteriorating item.

Figure 2A:
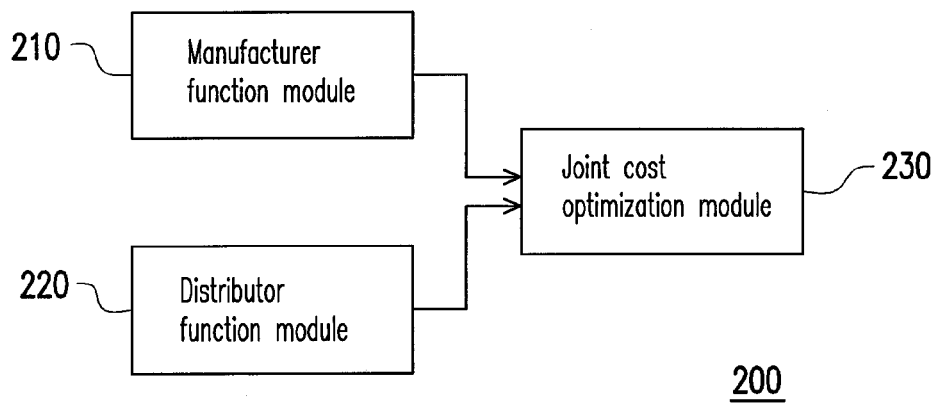
FIGS. 2A-2D are block diagrams illustrating a dual-warehouse management system for a supply chain according to an embodiment of the present invention.
Figure 2B:
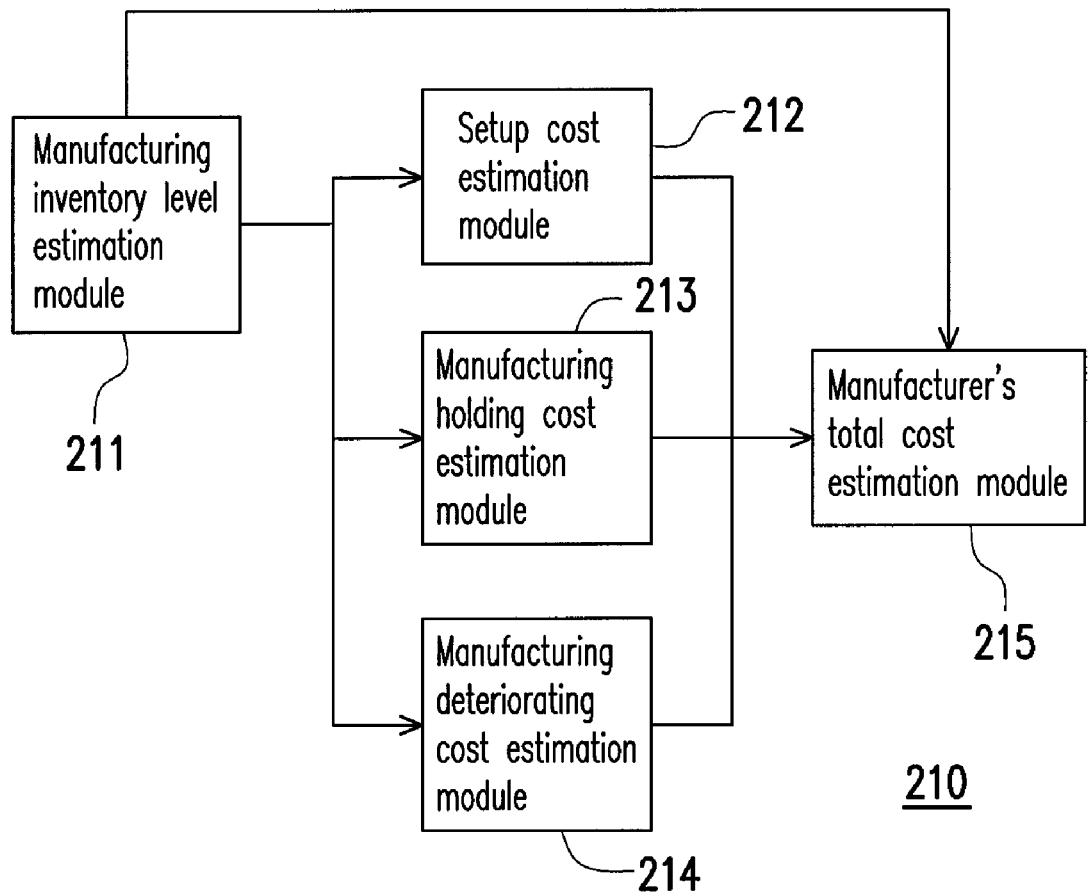

The manufacturer function module 210 shown as FIG. 2B includes a manufacturing inventory level estimation module 211, a setup cost estimation module 212, a manufacturing holding cost estimation module 213, a manufacturing deteriorating cost estimation module 214 and a manufacturing total cost estimation module 215.

The manufacturing inventory level estimation module 211 estimates a manufacturing inventory level $I_M$ according to a production rate and a manufacturing inventory deteriorating rate, and a calculation method thereof is as follows:

$$I_M(t) = \frac{p}{\theta_1}[1 - e^{-\theta_1 t}], 0 \le t \le t_p.$$

Wherein, p represents a daily production rate, $\theta_1$ represents the manufacturing inventory deteriorating rate of the manufacturer, and $t_p$ represents a manufacturing time length of the deteriorating item.

The setup cost estimation module 212 estimates a setup cost SC according to a time value of money, the delivering frequency and a product manufacturing period, and a calculation method thereof is as follows:

$$SC = C_S \left( \frac{1 - e^{-RT}}{1 - e^{-RT_1}} \right).$$

Wherein, $C_S$ represents the manufacturer setup cost, R represents the time value of money, T represents a planning horizon, and $T_1$ represents a time length of the product manufacturing period of the first cycle.

The manufacturing holding cost estimation module 213 estimates a manufacturing holding cost $HC_M$ according to the manufacturing inventory level, the time value of money and the product manufacturing period, and a calculation method thereof is as follows:

$$HC_M = \sum_{j=1}^{n} H_M e^{-RT_{j-1}} \int_0^{t_p} I_M(t) e^{-R(t_m+t)} dt, t_m = T_1 - t_p.$$

Wherein, $H_M$ represents a daily unit holding cost of a manufacturer warehouse, $T_j$ represents a time length of the product manufacturing period of a j-th cycle (the time length of the product manufacturing period of each cycle is the same), $t_m$ represents the time length of the cycled product manufacturing period subtracting each manufacturing time length, and n represents the delivering frequency.

The manufacturing deteriorating cost estimation module 214 estimates a manufacturing deteriorating cost $DC_M$ according to the manufacturing inventory deteriorating rate, the delivering frequency and the product manufacturing period, and a calculation method thereof is as follows:

$$DC_M = P_M \sum_{j=1}^{n} \theta_1 \int_0^{t_p} I_M(t) \cdot e^{-R(t_m+t)} dt \cdot e^{-RT_{j-1}}.$$

Wherein, $P_M$ represents a unit deteriorating cost of the manufacturer.

The manufacturer's total cost estimation module 215 is used for calculating the manufacturer's total cost $TC_M$, and a calculation method thereof is as follows:

$$TC_M(q,n) = SC + HC_M + DC_M.$$

Figure 2C:
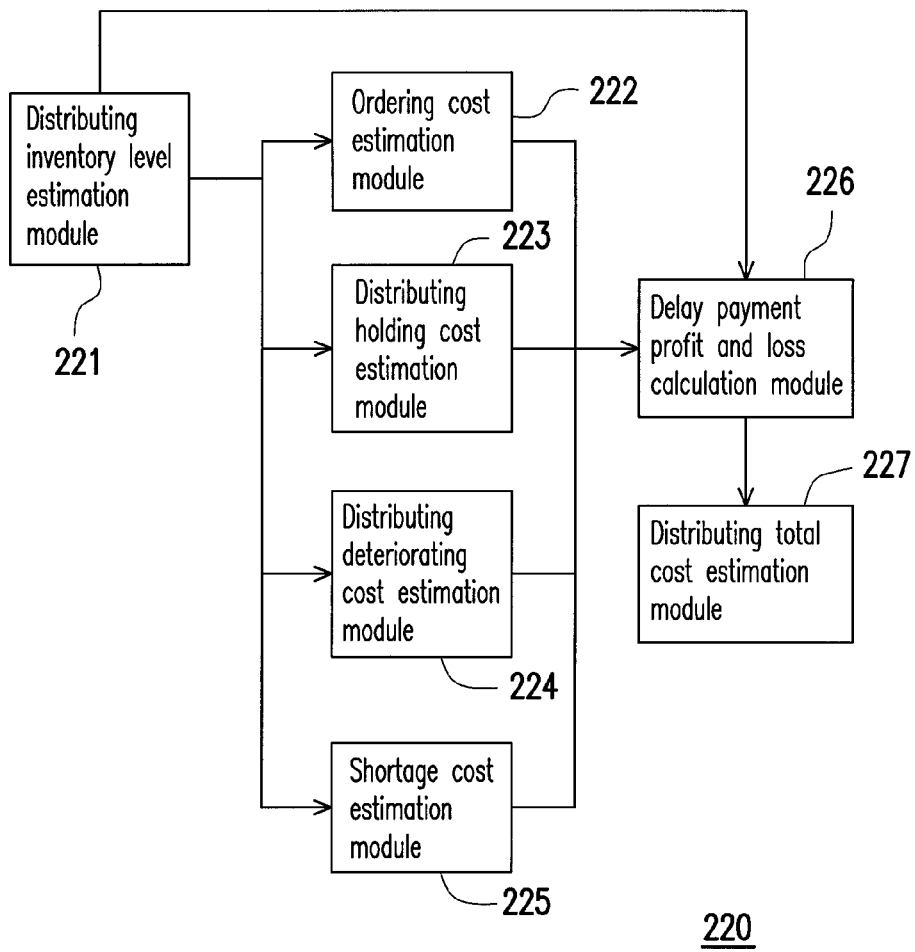

Referring to FIG. 2A again, the distributor function module 220 estimates a distributor's total cost according to a respective distributing inventory level, a respective distributing deteriorating cost of the deteriorating item in the owned warehouse and the rented warehouse, and the delivering frequency. As shown in FIG. 2C, the distributor function module 220 includes a distributing inventory level estimation module 221, an ordering cost estimation module 222, a distributing holding cost estimation module 223, a distributing deteriorating cost estimation module 224, a shortage cost estimation module 225, a delay payment profit and loss calculation module 226 and a distributing total cost estimation module 227.

The distributing inventory level estimation module 221 respectively estimates the distributing inventory levels $I_{Ro}$ and $I_{Rr}$ of the owned warehouse and the rented warehouse according to the market demand, and the distributing inventory deteriorating rates of the owned warehouse and the rented warehouse, and a calculation method is as follows:

$$I_{Rr}(t) = \frac{d}{\theta_3}[e^{\theta_3(t_1-t)} - 1], 0 \le t \le t_1;$$

$$I_{Ro}(t) = \begin{cases} we^{-\theta_2 t}, & 0 \le t \le t_1 \\ \frac{-d + e^{-\theta_2(t-t_1)}(d + I_1 \theta_2)}{\theta_2}, & t_1 \le t \le t_1 + t_2. \end{cases}$$

Wherein, $I_1 = I_{Ro}(t_1) = we^{-\theta_2 t_1}$ represents the distributing inventory level of the owned warehouse at time $t_1$, w represents a maximum capacity of the owned warehouse, $\theta_2$ represents a distributing inventory deteriorating rate of the owned warehouse, $\theta_3$ represents a distributing inventory deteriorating rate of the rented warehouse, d represents a daily market demand, $t_1$ represents a demand period of the rented warehouse (i.e. a length of time using the rented warehouse in each cycle), and $t_2$ is a demand period of the owned warehouse (i.e. a length of time only using the owned warehouse in each cycle).

In the present embodiment, the distributor has the owned warehouse and the rented warehouse, and when the product lot q delivered from the manufacture exceeds the maximum capacity w of the owned warehouse, the exceeding part is delivered to the rented warehouse for storage.

The ordering cost estimation module 222 is used for estimating an ordering cost ORC of the distributor, and a calculation method thereof is as follows:

$$ORC = C_R \sum_{j=0}^{n-1} e^{-RTj} = C_R \left( \frac{1 - e^{-RT}}{1 - e^{-RT_1}} \right).$$

Wherein, $C_R$ represents an ordering cost of the deteriorating item was ordered by the distributor from the manufacturer.

The distributing holding cost estimation module 223 is used for estimating the respective distributing holding costs $HC_{Rr}$ and $HC_{Ro}$ of the rented warehouse and the owned warehouse. Here, the rented warehouse has a rent concession mode for attracting a long term renting of a renter, and a rent system of the rented warehouse is as follows:

$$h(t_r) = \begin{cases} H_{Rr} e^{-\alpha t_r}, & 0 < t_r \le t_{max} \\ H_{Rr} e^{-\alpha t_{max}}, & t_{max} < t_r \end{cases}, \alpha = -\ln(1 - u/100).$$

Wherein, $h(t_r)$ represents a holding cost of the rented warehouse, and $H_R$ represents a daily unit holding cost of the rented warehouse of the distributor. Accordingly, the distributing holding cost estimation module 223 estimates the distributing holding costs $HC_{Rr}$ and $HC_{Ro}$ according to following equations:

$$HC_{Rr} = \sum_{j=1}^{n} \int_0^{t_1} \frac{d}{\theta_3}[e^{\theta_3(t_1-t)} - 1] \cdot H_{Rr} e^{-\alpha t_r} e^{-Rt} dt \cdot e^{-RTj}; \text{ and}$$

$$HC_{Ro} = \sum_{j=1}^{n} H_{Ro} \left( \int_0^{t_1} I_{Ro}(t) e^{-Rt} dt + \int_{t_1}^{t_1+t_2} I_{Ro}(t) e^{-Rt} dt \right) e^{-RTj}.$$

The distributing deteriorating cost estimation module 224 is used for estimating a summation $DC_R$ of the respective distributing deteriorating costs $DC_{Ro}$ and $DC_{Rr}$ of the owned warehouse and the rented warehouse according to the inventory deteriorating rates $\theta_2$ and $\theta_3$ and the demand periods $t_1$ and $t_2$ of the owned warehouse and the rented warehouse, and the delivering frequency n, and a calculation method thereof is as follows:

$$DC_R = DC_{Rr} + DC_{Ro}$$

$$= \sum_{j=1}^{n} P_R \cdot \left( \theta_2 \int_0^{t_1} I_{Rr}(t) \cdot e^{-Rt} dt + \theta_3 \int_0^{t_1} I_{Ro}(t) \cdot e^{-Rt} dt + \theta_3 \int_{t_1}^{t_1+t_2} I_{Ro}(t) \cdot e^{-Rt} dt \right) e^{-RTj}.$$

Wherein, $P_R$ represents a unit deteriorating cost of the distributor.

The shortage cost estimation module 225 is used for estimating a shortage cost OC according to a unit shortage cost, a distribution shortage time, the market demand and the delivering frequency, and a calculation method thereof is as follow:

$$OC = \sum_{j=1}^{n} C_o \int_0^{t_3} (td) \cdot e^{-R(t_1+t_2+t)} dt \cdot e^{-RTj}.$$

Wherein, $C_o$ represents the unit shortage cost, and t3 is the distribution shortage time.

The delay payment profit and loss calculation module 226 calculates profit and loss of a distributing delay payment. In detail, when the manufacturer delivers the product lot with size q to the distributor, if the distributor delays the payment, the manufacturer allows the distributor to delay the payment for a delay payment term $t_d$. Accordingly, the delay payment profit and loss calculation module 226 can estimate whether the profit is reduced when the delay payment term $t_d$ is exceeded or not exceeded.

Regarding the distributor of a deteriorative dual-warehouse inventory mode under the delay payment term, the distributing total cost is mainly determined based on three conditions, i.e. the delay payment term is less than the length of time using the rented warehouse ($t_d \le t_1$), the delay payment term is greater than the length of time using the rented warehouse and less than the total length of time using the rented warehouse and only using the owned warehouse ($t_1 < t_d < t_1 + t_2$), and the delay payment term is greater than the total length of time using the rented warehouse and only using the owned warehouse ($t_d \ge t_1 + t_2$).

Before the delay payment term is reached, the distributor can earn a certain proportion interest of the holding cost based on the sold products. Conversely, after the delay payment term is reached, the distributor has to burden an interest of the unsold products. If the earning interest of the sold products of the previous period can still be enjoyed during a next period of the delay payment term, calculation methods of a payable interest $C_i$ and the earning interest $C_e$ ($i_c$ and $i_e$ are respectively a percentage of the payment interest and the earning interest) are as follows:

When $t_d \leq t_1$, the payable interest is:

$$C_i = i_c \sum_{j=1}^{n} \left[ h(t_r) e^{-RT_j} \int_{t_d}^{t_1} I_{Rr}(t) \cdot e^{-Rt} dt + H_{Ro} e^{-RT_j} \left( \int_{t_1}^{t_1+t_2} I_{Ro}(t) \cdot e^{-Rt} dt + \int_{0}^{t_1} I_{Ro}(t) \cdot e^{-Rt} dt \right) \right],$$

and the earning interest is:

$$C_e = i_e \sum_{j=1}^{n} h(t_r) e^{-RT_j} \int_{0}^{t_d} (dt) \cdot e^{-Rt} dt.$$

Moreover, when $t_1 < t_d < t_1 + t_2$, the payable interest is:

$$C_i = i_c \sum_{j=1}^{n} H_{Ro} e^{-RT_j} \int_{t_d}^{t_1+t_2} I_{Ro}(t) \cdot e^{-Rt} dt,$$

and the earning interest is:

$$C_e = i_e \sum_{j=1}^{n} \left[ h(t_r) e^{-RT_j} \int_{0}^{t_1} (dt) \cdot e^{-Rt} dt + H_{Ro} e^{-RT_j} \int_{t_1}^{t_d} (dt) \cdot e^{-Rt} dt \right].$$

When $t_d \geq t_1 + t_2$, the payable interest is:

$$C_i = 0,$$

and the earning interest is:

$$C_e = i_e \sum_{j=1}^{n} \left[ \left( h(t_r) \int_{0}^{t_1} (dt) \cdot e^{-Rt} dt + H_{Ro} \int_{t_1}^{t_1+t_2} (dt) \cdot e^{-Rt} dt + \frac{t_1 H_{Ro} + t_2 h(t_r)}{t_1 + t_2} \times (t_d - (t_1 + t_2)) \int_{0}^{t_1+t_2} (d) dt \cdot \int_{t_1+t_2}^{t_d} e^{-Rt} dt \right) e^{-RT_j} \right].$$

The distributing total cost estimation module 227 is used for calculating a distributing total cost $TC_R$, and a calculation method thereof is as follows:

$$TC_R(q,n) = ORC + HC_{Rr} + HC_{Ro} + DC_R + OC + C_i - C_e.$$

Figure 2D:
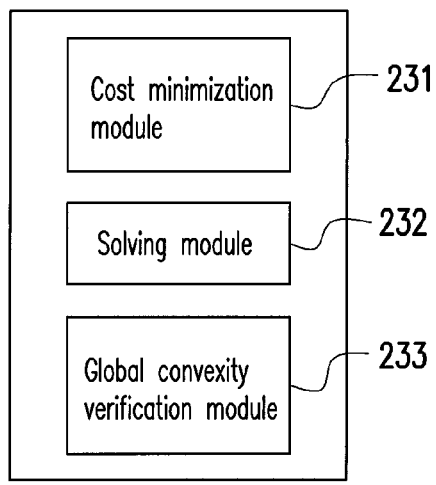

The joint cost optimization module 230 is used for calculating a minimum of the joint cost obtained by adding the manufacturer's total cost and the distributor's total cost, so as to obtain the product lot and the delivery times of the deteriorating item to be delivered from the manufacturer to the distributor in a planning horizon. As shown in FIG. 2D, the joint cost optimization module 230 includes a cost minimization module 231, a solving module 232 and a global convexity verification module 233.

The cost minimization module 231 is used for calculating a minimum joint total cost. Here, the cost minimization module 231 establishes a joint cost calculation function as:

$$TC(q,n) = TC_M(q,n) + TC_R(q,n).$$

Wherein, $w < q$, $t_1 \geq 0$, $t_2 \geq 0$, $t_3 \geq 0$, $n > 0$, and $d < p$.

The solving module 232 is used for calculating an optimal solution according to the joint cost calculation function. Moreover, the global convexity verification module 233 can verify a global convexity of the joint cost calculation function, i.e. can verify whether a solution of the product lot q and delivering frequency n in the joint cost calculation function have minimum values respectively. Since the joint cost calculation function is non-linear, whether the total cost function has the local or global convexity is verified, and when the total cost function has the convexity, the optimal solution is then obtained.

In the present embodiment, the global convexity verification module 233 determines the extremality of the joint cost calculation function according to a Hessian matrix, and a calculation method thereof is as follows:

$$H(q,n) = \begin{bmatrix} \dfrac{\partial^2 TC(q,n)}{\partial q^2} & \dfrac{\partial^2 TC(q,n)}{\partial q \partial n} \\ \dfrac{\partial^2 TC(q,n)}{\partial n \partial q} & \dfrac{\partial^2 TC(q,n)}{\partial n^2} \end{bmatrix}.$$

Wherein, TC(q,n) have the minimum value under following conditions:

$$\frac{\partial^2 TC(q,n)}{\partial q^2} > 0, \quad \frac{\partial^2 TC(q,n)}{\partial n^2} > 0$$

and $$\frac{\partial^2 TC(q,n)}{\partial q^2} \times \frac{\partial^2 TC(q,n)}{\partial n^2} - \left( \frac{\partial^2 TC(q,n)}{\partial q \partial n} \right)^2.$$

Figure 3:
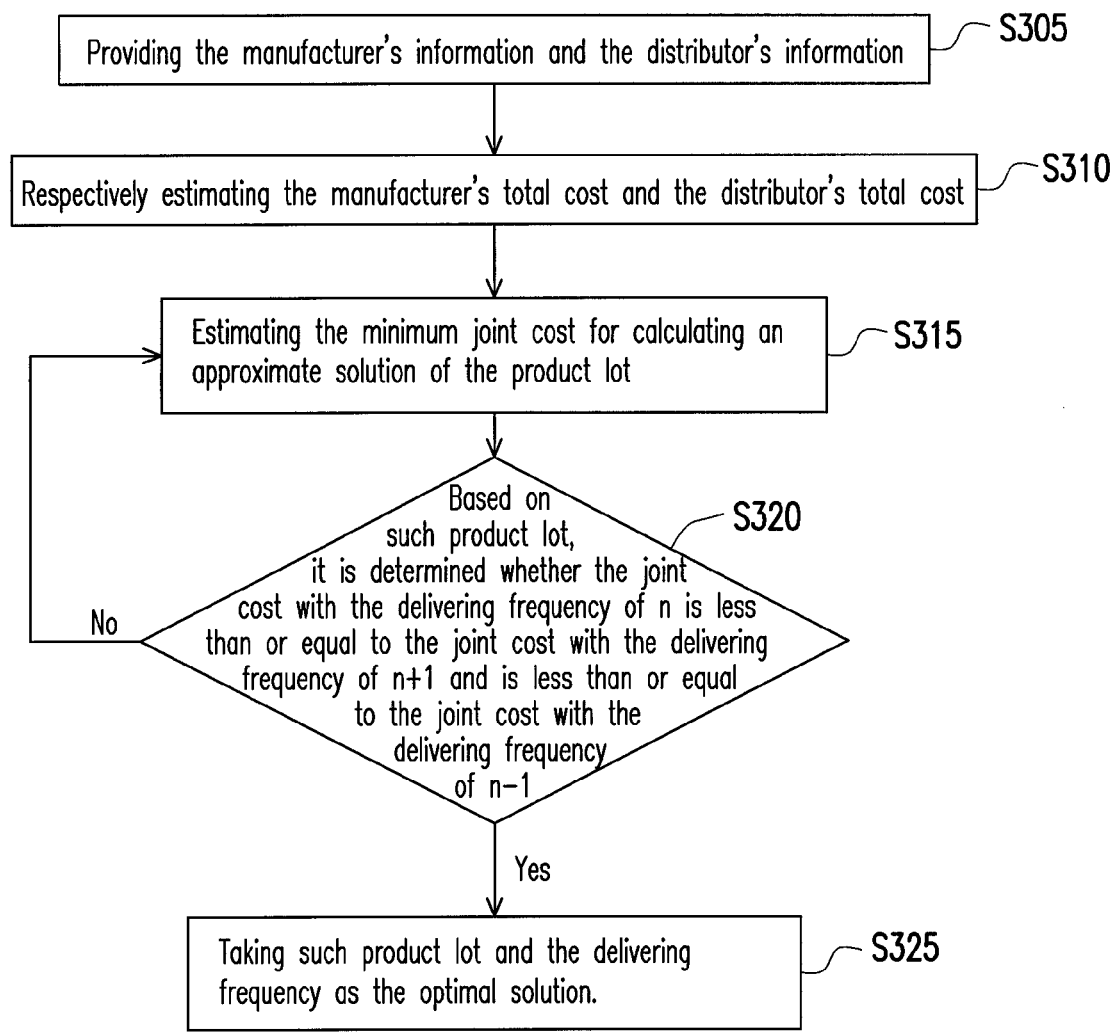
FIG. 3 is a flowchart illustrating a method for calculating a minimum joint cost according to an embodiment of the present invention.

An embodiment is provided below to describe a method for calculating a minimum joint cost of a supply chain dual-warehouse management system. FIG. 3 is a flowchart illustrating a method for calculating a minimum joint cost according to an embodiment of the present invention. Referring to FIG. 2A and FIG. 3, first, in step S305, the manufacturer's information and the distributor's information are provided, wherein the manufacturer's information includes the manufacturing inventory level and the manufacturing deteriorating cost of the deteriorating item, and the distributor's information includes the respective distributing inventory levels and the respective distributing deteriorating costs of the deteriorating item in the owned warehouse and the rented warehouse. Here, the manufacturer's information and the distributor's information are stored in a buffer or a database.

Next, in step S310, the manufacturer function module 210 and the distributor function module 220 respectively estimate the manufacturer's total cost and the distributor's total cost according to the manufacturer's information and the distributor's information.

Next, in step S315, the joint cost optimization module 230 estimates the minimum joint cost for calculating an approximate solution of the product lot, so as to obtain the product lot and the delivery times of the deteriorating item to be delivered from the manufacturer to the distributor in a planning horizon.

Next, in step S320, based on such product lot, it is determined whether the joint cost with the delivery times of n is less than or equal to the joint cost with the delivery times of n+1 and is less than or equal to the joint cost with the delivery times of n−1. Here, the delivering frequency n is a positive integer and an initial value thereof is 1.

When the joint cost with the delivery times of n is greater than the joint cost with the delivery times of n+1, or when the joint cost with the delivery times of n is greater than the joint cost with the delivery times of n−1, the step S315 is repeated, in which after n is added by 1, another approximate product lot is repeatedly calculated.

Conversely, when the joint cost with the delivery times of n is less than or equal to the joint cost with the delivery times of n+1, and meanwhile the joint cost with the delivery times of n is also less than or equal to the joint cost with the delivery times of n−1, in step S325, such product lot and the delivering frequency n are considered as the optimal solution.

Regarding the joint cost calculation function is $TC(q,n)=TC_M(q,n)+TC_R(q,n)$, wherein $w<q$, $t_1 \geq 0$, $t_2 \geq 0$, $t_3 \geq 0$, $n>0$ and $d<p$, a calculation method of the solving module 232 is as follows:

A. First, the delivering frequency n is an integer, and the initial value thereof is 1.
B. Next, partial differential $TC(q, n)$ is 0, and an approximate solution of q is obtained. Namely, $$\frac{\partial TC(q, n)}{\partial q} = 0,$$

and q is obtained.
C. Next, the joint costs $TC(q(n), n)$, $TC(q(n+1), n+1)$ and $TC(q(n−1), n−1)$ are obtained, and $n=n+1$.
D. Steps B and C are repeated, and the optimal solution is obtained until the follow condition is satisfied:

$$TC(q(n^*-1), n^*-1) \geq TC(q^*, n^*) \leq TC(q(n^*+1), n^*+1).$$

Another numeral embodiment is provided below for description.

The manufacturer's information is as follows. A daily production rate p is 60 units/day, a manufacturer unit deteriorating cost $P_M$ is $6/unit, a manufacturer warehouse daily unit holding cost $H_M$ is $1/day, a manufacturer setup cost $C_S$ is $1000/times, a manufacturer inventory deteriorating rate $\theta 1$ is 0.05, and a time value is money R of −0.004.

Moreover, the distributor's information is as follows. A planning horizon T is 365 days, a daily market demand d is 45 units/day, a distributor ordering cost $C_R$ is $1500/times, a distributor owned warehouse daily unit holding cost $H_{Ro}$ is $0.8/day, a distributor rented warehouse daily unit holding cost $H_{Rr}$ is $1/day, a distributor unit deteriorating cost $P_R$ is $7/unit, a payable interest percentage $i_c$ is 0.02, an earning interest percentage $i_e$ is 0.01, a unit shortage cost $C_o$ is $9/unit, a distributor rented warehouse rental term $t_r$ is 90 days, a delay payment term $t_d$ is 0 day, 7 days, or 30 days, a distributor owned warehouse inventory deteriorating rate $\theta_2$ is 0.055, and a distributor rented warehouse inventory deteriorating rate $\theta_3$ is 0.045.

By applying the aforementioned manufacturer's information and distributor's information to the supply chain dual-warehouse management system, an execution result thereof is shown as a following table:

| Standpoint | q* | n* | $t_P$ | $t_1$ | $t_2$ | $t_3$ | TC |
|---|---|---|---|---|---|---|---|
| $t_d = 0$ | | | | | | | |
| Integration | 284 | 52 | 5.40 | 4.49 | 1.01 | 1.51 | 532,788 |
| Manufacturer | 61 | 1 | 1.04 | 0.02 | 1.29 | 363.69 | 323,004,683 |
| Distributor | 634 | 30 | 15.03 | 10.08 | 0.75 | 1.34 | 789,813 |
| $t_d = 7$ | | | | | | | |
| Integration | 284 | 52 | 5.40 | 4.49 | 1.01 | 1.51 | 532,077 |
| Manufacturer | 61 | 1 | 1.04 | 0.02 | 1.29 | 363.69 | 323,004,676 |
| Distributor | 577 | 34 | 13.11 | 9.26 | 0.78 | 0.69 | 737,635 |
| $t_d = 30$ | | | | | | | |
| Integration | 289 | 54 | 5.51 | 4.58 | 1.01 | 1.17 | 402,051 |
| Manufacturer | 61 | 1 | 1.04 | 0.02 | 1.29 | 363.69 | 323,004,508 |
| Distributor | 568 | 35 | 12.82 | 9.13 | 0.79 | 0.51 | 617,751 |

Wherein, "Integration" in the standpoint column represents the minimum of the joint cost of the manufacturer and the distributor, i.e. the minimum of $TC(q, n)$, "Manufacturer" represents the minimum of the manufacturer's total cost, i.e. the minimum $TC_M(q, n)$, and "Distributor" represents the minimum of the distributor's total cost, i.e. the minimum of $TC_R(q, n)$.

Accordingly, as the delay payment term $t_d$ is increased, the total costs of the three standpoints are all decreased. This is because when the delay payment term $t_d$ is increased, the earning interest thereof is increased, and the payable interest is decreased, so that the joint cost is accordingly decreased.

If only the standpoint of the manufacturer is considered, the manufacturer's total cost can be effectively reduced by reducing a production quantity, though such action can increase the distributor's total cost due to a stock out of the products. Conversely, if only the standpoint of the distributor is considered, the delivering frequency can be relatively decreased by increasing the ordered product lot, so as to achieve a relatively cheap holding cost of the rented warehouse, and reduce the distributing total cost. However, such action can lead to a relatively high manufacturing deteriorating cost and a relatively high manufacturing holding cost of the manufacturer due to the relatively large production quantity and an excessive long production time. Accordingly, only when the standpoints of the both sides are integrated can the minimum joint cost thereof be obtained. According to the aforementioned three different delay payment terms ($t_d$ of 0, 7 and 30), the integration standpoints thereof can all allow a stock out of the products, so that a suitable stock out of the products can lead to a relatively low joint cost.

In summary, in the aforementioned embodiment, an optimal manufacturing and distributing system of the deteriorating item in dual-warehouse is provided under the two-stage manufacturing and distributing supply chain, by which both of the manufacturer and the distributor can be benefited. Moreover, in the aforementioned dual-warehouse management system of the supply chain, a rent concession of the rented warehouse is considered, and the payable interest and the earning interest generated when the distributor delays to pay the manufacturer and the shortage cost of the distributor are also considered, so that a calculation result of the joint cost can be more accurate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual-warehouse management system for a supply chain, wherein the supply chain comprises a manufacturer and a distributor, the manufacturer delivers a product lot of a deteriorating item to the distributor, and the distributor manages a primary distribution warehouse and a secondary distribution warehouse and stores the product lot in the primary distribution warehouse, and stores remained product lot in the secondary distribution warehouse when the primary distribution warehouse reaches a maximum capacity, and the dual-warehouse management system for a supply chain comprising:
   a storage device, storing a plurality of programs written based on a computer programming language; and
   a central processing unit, executing the programs;
   wherein the programs comprising:
      a manufacturer function module, estimating a total cost of the manufacturer according to a manufacturing inventory level, a manufacturing deteriorating cost and a delivery times of the deteriorating item for the manufacturer;
      a distributor function module, estimating a total cost of the distributor according to a respective distributing inventory level, a respective distributing deteriorating cost of the deteriorating item for the primary distribution warehouse and the secondary distribution warehouse, the delivering frequency, and shortage cost; and
      a joint cost optimization module, calculating a minimum of a joint cost obtained by adding the manufacturer's total cost and the distributor's total cost, so as to obtain the product lot and the delivery times of the deteriorating item to be delivered from the manufacturer to the distributor in a planning time horizon,
      wherein the joint cost optimization module compares the joint costs with the delivery times of n, n+1 and n−1, and when the joint cost with the delivery times of n is less than or equal to the joint cost with the delivery times of n+1, and meanwhile when the joint cost with the delivery times of n is also less than or equal to the joint cost with the delivery times of n−1, the joint cost with the delivery times of n is determined to be the minimum.

2. The dual-warehouse management system for a supply chain as claimed in claim 1, wherein the joint cost optimization module comprises:
   a cost minimization module, establishing a joint cost calculation function to calculate the minimum of the joint cost; and
   a solving module, calculating an approximate solution according to the joint cost calculation function, and calculating the joint costs with the delivery times of n, n+1 and n−1, wherein n is a positive integer and an initial value thereof is 1,
   wherein when the joint cost with the delivery times of n is greater than the joint cost with the delivery times of n+1, or when the joint cost with the delivery times of n is greater than the joint cost with the delivery times of n−1, after n is added by 1, another approximate solution of the product lot is repeatedly calculated until the joint cost with the delivery times of n is less than or equal to the joint cost with the delivery times of n+1, and meanwhile the joint cost with the delivery times of n is also less than or equal to the joint cost with the delivery times of n−1.

3. The dual-warehouse management system for a supply chain as claimed in claim 2, wherein the joint cost optimization module further comprises:
   a global convexity verification module, verifying whether respective solutions of the product lot and the delivering frequency n in the joint cost calculation function have minimum values.

4. The dual-warehouse management system for a supply chain as claimed in claim 1, wherein the manufacturer function module comprises:
   a manufacturing inventory level estimation module, estimating the manufacturing inventory level according to a production rate and a manufacturing inventory deteriorating rate; and
   a manufacturer's total cost estimation module, estimating the manufacturer's total cost according to a setup cost, a manufacturing holding cost, the delivering frequency, the manufacturing inventory level and the manufacturing deteriorating cost of the manufacturer.

5. The dual-warehouse management system for a supply chain as claimed in claim 4, wherein the manufacturer function module further comprises:
   a setup cost estimation module, estimating the setup cost according to a time value of money, the delivering frequency and a product manufacturing period;
   a manufacturing holding cost estimation module, estimating the manufacturing holding cost according to the manufacturing inventory level, the time value of money and the product manufacturing period; and
   a manufacturing deteriorating cost estimation module, estimating the manufacturing deteriorating cost according to the manufacturing inventory deteriorating rate, the delivering frequency and the product manufacturing period.

6. The dual-warehouse management system for a supply chain as claimed in claim 1, wherein the distributor function module comprises:
   a distributing inventory level estimation module, respectively estimating the distributing inventory levels of the primary distribution warehouse and the secondary distribution warehouse according to a market demand and the respective distributing inventory deteriorating rates of the primary distribution warehouse and the secondary distribution warehouse;
   a delay payment profit and loss calculation module, calculating a payable interest and an earning interest when the distributor delays to pay the manufacturer; and
   a distributor's total cost estimation module, estimating the distributor's total cost according to the delivering frequency, an ordering cost of the distributor, the respective distributing holding costs, the respective distributing inventory levels and the respective distributing deteriorating costs of the primary distribution warehouse and the secondary distribution warehouse, a shortage cost, the payable interest and the earning interest.

7. The dual-warehouse management system for a supply chain as claimed in claim 6, wherein the distributor function module further comprises:
   an ordering cost estimation module, estimating the ordering cost according to a time value of money, the delivering frequency and a product manufacturing period;
   a distributing holding cost estimation module, respectively estimating distributing holding costs of the primary distribution warehouse and the secondary distribution warehouse according to the respective distributing inventory levels and respective demand periods of the primary distribution warehouse and the secondary distribution warehouse, and the time value of money;

a shortage cost estimation module, estimating the shortage cost according to a unit shortage cost, a distribution shortage time, the market demand and the delivering frequency; and a distributing deteriorating cost estimation module, estimating the respective distributing deteriorating costs of the primary distribution warehouse and the secondary distribution warehouse according to respective distributing inventory deteriorating rates, the respective demand periods of the primary distribution warehouse and the secondary distribution warehouse, and the delivering frequency.

8. A method for calculating a minimum joint cost for a dual-warehouse management system of a supply chain, performed on a computer, wherein the supply chain comprises a manufacturer and a distributor, the manufacturer delivers a product lot of deteriorating items to the distributor, and the distributor manages a primary distribution warehouse and a secondary distribution warehouse and stores the product lot in the primary distribution warehouse, and stores remained product lot in the secondary distribution warehouse when the primary distribution warehouse reaches a maximum capacity, the method for calculating a minimum joint cost comprising:

providing the manufacturer's information and the distributor's information into a storage device of the computer, the manufacturer's information comprising a manufacturing inventory level and a manufacturing deteriorating cost of the deteriorating item, and the distributor information comprising a respective distributing inventory level and a respective distributing deteriorating cost of the deteriorating item in the primary distribution warehouse and the secondary distribution warehouse;

reading the manufacturer's information and the distributor's information from the storage device by a central processing unit of the computer for executing following steps, comprising:

respectively estimating the manufacturer's total cost and the distributor's total cost according to the manufacturer's information and the distributor's information;

estimating a minimum of a joint cost obtained by adding the manufacturer's total cost and the distributor's total cost for calculating an approximate solution of the product lot, so as to obtain the product lot and a delivery times of the deteriorating item to be delivered from the manufacturer to the distributor in a planning horizon;

comparing the respective joint costs with the delivery times of n, n+1 and n−1 based on the product lot, wherein n is a positive number and an initial value thereof is 1; and when the joint cost with the delivery times of n is greater than the joint cost with the delivery times of n+1, or when the joint cost with the delivery times of n is greater than the joint cost with the delivery times of n−1, adding 1 to n and repeatedly calculating another approximate solution of the product lot until the joint cost with the delivery times of n is less than or equal to the joint cost with the delivery times of n+1, and meanwhile the joint cost with the delivery times of n is also less than or equal to the joint cost with the delivery times of n−1.

9. The method for calculating a minimum joint cost as claimed in claim 8, wherein the steps of estimating the manufacturer's total cost comprise:

estimating the manufacturing inventory level according to a production rate and a manufacturing inventory deteriorating rate; and estimating the manufacturer's total cost according to a setup cost, a manufacturing holding cost, the delivering frequency, the manufacturing inventory level and the manufacturing deteriorating cost of the manufacturer.

10. The method for calculating a minimum joint cost as claimed in claim 9, wherein the steps of estimating the manufacturer's total cost further comprise:

estimating the setup cost according to a time value of money, the delivering frequency and a product manufacturing period;

estimating the manufacturing holding cost according to the manufacturing inventory level, the time value of money and the product manufacturing period; and estimating the manufacturing deteriorating cost according to the manufacturing inventory deteriorating rate, the delivering frequency and the product manufacturing period.

11. The method for calculating a minimum joint cost as claimed in claim 8, wherein the steps of estimating the distributing total cost comprise:

respectively estimating the distributing inventory levels of the primary distribution warehouse and the secondary distribution warehouse according to a market demand and the respective distributing inventory deteriorating rates of the primary distribution warehouse and the secondary distribution warehouse;

calculating a payable interest and an earning interest when the distributor delays to pay the manufacturer; and estimating the distributing total cost according to the delivering frequency, an ordering cost of the distributor, the respective distributing holding costs, the respective distributing inventory levels and the respective distributing deteriorating costs of the primary distribution warehouse and the secondary distribution warehouse, a shortage cost, the payable interest and the earning interest.

12. The method for calculating a minimum joint cost as claimed in claim 11, wherein the steps of estimating the distributing total cost further comprise:

estimating the ordering cost according to a time value of money, the delivering frequency and a product manufacturing period;

respectively estimating distributing holding costs of the primary distribution warehouse and the secondary distribution warehouse according to the respective distributing inventory levels and respective demand periods of the primary distribution warehouse and the secondary distribution warehouse, and the time value of money;

estimating the shortage cost according to a unit shortage cost, a distribution shortage time, the market demand and the delivering frequency; and estimating the respective distributing deteriorating costs of the primary distribution warehouse and the secondary distribution warehouse according to respective distributing inventory deteriorating rates, the respective demand periods of the primary distribution warehouse and the secondary distribution warehouse, and the delivering frequency.

13. The method for calculating a minimum joint cost as claimed in claim 8 further comprising:

verifying whether the respective approximate solutions of the product lot and distributing frequency n have minimum values according to a Hessian matrix.

* * * * *